Nov. 28, 1972  R. A. PARIS ET AL  3,704,116
DISPERSIONS OF NITRIDES IN A METAL OR ALLOY AND
THEIR METHOD OF PREPARATION
Filed July 1, 1970

INVENTOR
RENE ANTOINE PARIS
DOMINIQUE THIBAUDON
MARC PIERRE ROUBIN
JACQUES MAURICE PARIS

BY William W Stokes

ATTORNEY

United States Patent Office 3,704,116
Patented Nov. 28, 1972

3,704,116
DISPERSIONS OF NITRIDES IN A METAL OR ALLOY AND THEIR METHOD OF PREPARATION
Rene A. Paris and Dominique Thibaudon, Lyon, Marc P. Roubin, Villeurbanne, and Jacques M. Paris, Lyon, France, assignors to Agence Nationale de Valorisation de la Recherche, Paris, France
Filed July 1, 1970, Ser. No. 51,517
Claims priority, application France, July 4, 1969, 6922754
Int. Cl. C22c 11/04; C01b 21/06
U.S. Cl. 75—.5 AC
7 Claims

ABSTRACT OF THE DISCLOSURE

The dispersions are characterised by the fact that the particles of single or mixed nitrides are distributed uniformly in the midst of the selected base metal or alloy. To manufacture these dispersions a mixed oxide, a coprecipitate of hydroxides or a mixed complex of a first metal providing the nitride and of a second metal providing the base metal are subjected to a heat treatment in an enclosure in an atmosphere simultaneously reducing and nitriding of hydrogen and ammonia or nitrogen. The heat treatment is carried out at less than 1100° C. to which the starting materials are brought at a speed of 100 to 400° C./hour. These dispersions are used in conventional techniques of powder metallurgy.

---

Figure 1:
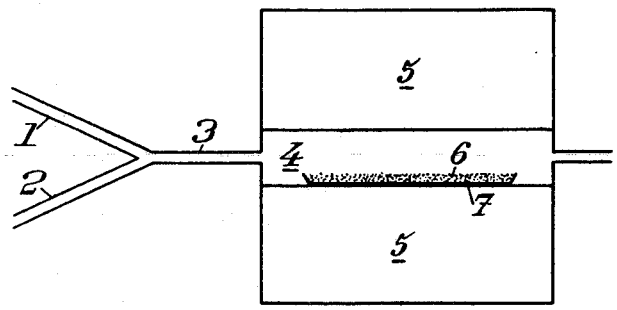

The invention relates to dispersions of nitrides in a metal or alloy, these dispersions being of the type of those which enable the strengthening of mechanical properties to be obtained, especially the hardness and resistance to flow, of the said metal or alloy, especially at high temperature.

It relates also to a method for the preparation of these dispersions.

Dispersions of the type concerned are already known, obtained by mixing a nitride and a base metal in the orm of very fine particles and by heating this mixture under pressure.

These dispersions do not have a degree of homogeneity and of fineness of grain which are satisfactory and, in addition, their method of preparation is complicated.

It is a particular object of the invention to provide dispersions of the type concerned which respond better than those already known to the various desiderata of the practice and to make available to industry a method of manufacture of the said dispersions which is easy to put into practice and which ensures a constant quality of the products obtained.

The dispersions of the type concerned according to the invention are characterised in that they comprise particles of a single or mixed nitride distributed uniformly in the midst of elementary grains of the selected base metal or alloy.

The method according to the invention for the preparation of the abovesaid dispersions is characterised in that:

In a first step, there is prepared a mixed oxide, a coprecipitate of hydroxide or a mixed complex of a first metal (or several if it is desired to obtain a mixed nitride) intended to provide the nitride and selected from among Ti, V, Nb, Ta and Cr and of a second metal (or several if it is desired to obtain an alloy) intended to provide the base metal and selected from among Fe, Co, Ni, Cu, Zn, Cd, Ag, Sn, Pb, Bi, Ge and Tl.

In a second step, the compound thus obtained is subjected to an atmosphere both reducing and nitriding of hydrogen and ammonia or nitrogen, to a heat treatment of which the temperature—less than 1100° C.—and the time are selected so that the reduction of all the oxides and the nitridation of the first metal are ensured, the bringing to temperature being preferably effected at a speed of the order of 100 to 400° C./hour.

In the products thus obtained, the dimensions of the particles of the dispersed phase—which are not concentrated at the grain junctures of the metallic phase, but distributed uniformly inside the latter—are of the order of 5 to 500 mμ.

When it is desired that the continuous metallic phase be constituted by an alloy, a mixed oxide of metals of the second group is utilized.

In the case where the nitride of the second metal is stable under the conditions of simultaneous nitridation and reduction, recourse is had to a supplementary reduction treatment with pure hydrogen at the same temperature for a time sufficient to completely reduce the nitride of the said second metal.

The invention can be put into practice in a fixed bed or a fluidised bed.

Figure 2:
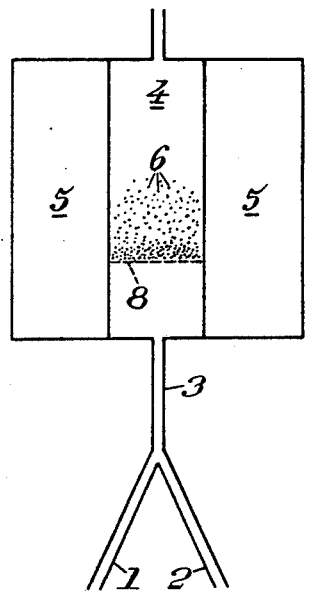

According to the method selected, recourse can then be had respectively to an apparatus of the type of that shown diagrammatically in FIG. 1, or to an apparatus of the type of that shown diagrammatically in FIG. 2.

In the two cases, the hydrogen and the ammonia (or nitrogen) arrive respectively through pipes 1 and 2 opening into a single pipe 3 which leads the gaseous mixture to the inside of an enclosure 4 which is heated by heating elements 5.

In the case of FIG. 1, the enclosure 4 is arranged horizontally and the product 6 to be treated is spread in a thin layer in a container 7 inside this enclosure. The treatment gas comes into contact with the surface of the product 6.

In the case of FIG. 2, the enclosure is arranged vertically, the product 6 forming a fluid bed above a grid 8. It is to be noted that this device enables also working in a fixed bed, the treatment gas then passing through the layer of product 6.

The device of FIG. 2 enables the treatment of larger quantities of product 6 in shorter reaction times, whether this is in a fixed bed or in a fluid bed, since it procures better contact between the product to be treated and the treating atmosphere.

To establish ideas, it is indicated that the duration of the simultaneous nitridation and reduction step is—in the case of the treatment in a fixed bed by means of the apparatus of FIG. 1— generally of the order of 10 to 20 hours.

The proportions of hydrogen and of ammonia of the atmosphere used during this step are respectively of the order of 25 to 75 and 75 to 25%.

The dispersions according to the invention, prepared by means of the abovesaid method, can be used by practising conventional techniques of powder metallurgy, by subjecting them to sintering, either as they are, or after having mixed them with a powder of the same base metal if the proportion of nitride has to be reduced in the final material.

In order that the invention may be more fully understood, a number of embodiments of the method and products according to the invention are described below, purely by way of illustrative but non-limiting examples.

EXAMPLE 1

In order to prepare a dispersion of 20% by weight of chromium nitride CrN, in nickel, one starts by preparing the starting compound, that is to say a coprecipitate of hydroxide, in the following manner. There is introduced simultaneously, but separately and drop by drop, into about a litre of water vigorously stirred contained in a reaction vessel of the Pyrex glass type, of 2 litres capacity, an aqueous solution of 48.6 g. of nickel chloride $$NiCl_2 \cdot 6H_2O$$

and of 12.1 g. of chromium sesquichloride $CrCl_3 \cdot 6H_2O$ as well as a 25% solution of ammonia. Throughout the simultaneous precipitation of the two hydroxides, the pH of the solution, which is 8, is strictly controlled to avoid redissolutions of the hydroxides. The very fine precipitate obtained is washed thoroughly with changes of water and then dried for 20 hours in the oven at 110° C.

The product thus obtained is subjected to the reaction of a gaseous current constituted of ammonia (10 l./h.) and hydrogen (10 l./h.) and the temperature is brought to 1000° C. at the rate of 250° C./h. After about fifteen hours of maintenance at this temperature in the atmosphere concerned and cooling, radiocrystallographic analysis shows that the product obtained corresponds to a dispersion of nitride CrN (cubic with centred faces) in the metallic nickel. By crushing, this product is easily converted into the form of a fine powder.

EXAMPLE 2

In order to prepare a dispersion of 5% by weight of titanium nitride in cobalt, one starts by preparing the coprecipitate of the two hydrated oxides according to the operational method described in Example 1, by using a saline solution of cobalt chloride and titanyl sulphate in suitable proportions.

The compound thus obtained is subject to the action of a gaseous current constituted of ammonia (10 l./h.) and hydrogen (10 l./h.). The temperature is brought to 1000° C. at the rate of 250° C./h. After fifteen hours maintenance at this temperature, in the atmosphere concerned and cooling, radiocrystallographic analysis confirms the obtaining of a dispersion of TiN nitride (cubic with centred faces) in β-cobalt (cubic with centred faces).

EXAMPLE 3

In order to prepare a dispersion of 50% by weight of titanium nitride in iron, one starts by preparing the coprecipitate of the two hydrated oxides according to the operational method described in Example 1, by using a saline solution of ferric nitrate and titanyl sulphate in suitable proportions.

The compound thus obtained is subjected to the action of a gaseous current constituted of ammonia (20 l./h.) and hydrogen (10 l./h.). The temperature is brought to 1000° C. at the rate of 250° C./h. After fifteen hours maintenance at this temperature in the atmosphere concerned and cooling, the radiocrystallographic analysis shows that the product obtained is constituted of nitrides of iron $Fe_3N$ and $\gamma'Fe_4N$ and of titanium nitride TiN (cubic with centred faces).

The iron nitrides being less stable than the nitrides of the transition metals, the nitrided product previously obtained is finely crushed and reheated at 1000° C. for 12 hours in a current of hydrogen of high purity. This reheating enables the selective and progressive elimination of the nitrogen from the iron nitrides. Radiocrystallographic analysis confirms the obtaining of a dispersion of titanium nitride TiN in α-iron.

EXAMPLE 4

In order to prepare a dispersion of 30% by weight of niobium nitride NbN in iron, one starts by preparing a coprecipitate of hydrated oxides according to the operational method described in Example 1, by using an aqueous solution of ferric nitrate and ammonium oxalatoniobate (V) $(NH_4)_3[NbO(C_2O_4)_3] \cdot 1.5H_2O$ in suitable proportions.

The compound thus obtained is subjected to the action of a gaseous current constituted of ammonia (15 l./h) and hydrogen (10 l./h.). The temperature is brought to 1000° C. at the rate of 250° C./h. After fifteen hours maintenance at this temperature in the atmosphere concerned and cooling, radiocrystallographic analysis shows that the product obtained is constituted of the nitriles of iron $Fe_3N$ and of hexagonal niobium δ-NbN.

The nitrided product obtained is converted into fine powder by crushing, and reheated 12 hours at 1000° C. in a current of hydrogen of high purity. This reheating enables elimination of iron nitride. Radiocrystallographic analysis confirms the obtaining of a dispersion of hexagonal niobium nitride in α-iron.

EXAMPLE 5

In order to prepare a dispersion of 3% by weight of vanadium nitride VN in nickel, one starts by preparing a coprecipitate of the two hydrated oxides according to the method of operation described in Example 1, by using an aqueous solution of nickel nitrate and vanadyl sulphate in suitable proportions.

The compound thus obtained is subjected to the action of a gaseous current constituted of ammonia (10 l./h.) and hydrogen (10 l./h.). The temperature is brought to 1000° C. at the rate of 250° C./h. After fifteen hours maintenance at this temperature in the atmosphere concerned and cooling, radiocrystallographic analysis shows that the product obtained is a dispersion of vanadium nitride VN (cubic with centred faces) of parameter $a=4.13$ A., in nickel.

EXAMPLE 6

In order to prepare a dispersion of 10% by weight of the solid solution of vanadium nitrides and titanium VN-TiN (in the atomic ratio V/Ti=1) in iron, one starts by preparing a coprecipitate of the three hydrated oxides according to the method of operation described in Example 1, by using an aqueous solution of ferric nitrate, vanadyl sulphate and titanyl sulphate in suitable proportions.

The starting compound is subjected to the action of the gaseous current constituted of ammonia (10 l./h.) and hydrogen (10 l./h.). The temperature is brought to 1000° C. at the rate of 250° C./h. After fifteen hours maintenance at this temperature in the atmosphere concerned and cooling, radiocrystallographic analysis shows that the product obtained is constituted of iron nitrides $Fe_3N$ (hexagonal system) and $\gamma Fe_4N$ (cubic system with centred faces) and solid solution of TiN and VN nitrides, cubic with centred faces (of parameter intermediate to that of TiN and of VN).

A reheating of 12 hours at 1000° C., in a current of hydrogen of high purity, provides a dispersion of the solid solution of titanium nitrides and of vanadium nitrides TiN-VN in α-iron.

EXAMPLE 7

In order to prepare a dispersion of 20% by weight of the solid solution of chromium and vanadium nitrides CrN and VN (in the atomic ratio Cr/V=3) in nickel, one commences by preparing a coprecipitate of the three hydrated oxides according to the method of operation described in Example 1, by using an aqueous solution of nickel chloride, of chromium sesquichloride and of vanadyl sulphate in suitable proportions.

The compound thus obtained is subjected to the action of a gaseous current constituted of ammonia (10 l./h.) and hydrogen (10 l./h.). The temperature is brought to 1000° C. at the rate of 250° C./h. After fifteen hours maintenance at this temperature in the atmosphere concerned and cooling, radiocrystallographic analysis shows that the product obtained is a dispersion of the solid solution of chromium and vanadium nitrides CrN-VN in nickel.

EXAMPLE 8

In order to prepare a dispersion of chromium nitrides CrN in copper, containing 80% by weight of copper, one commences by preparing the starting compound, that is to say an intimate mixture obtained by coevaporation of a solution of the citrates of copper and of chromium. This solution is obtained by heating under reflux for 2 hours an aqueous solution of diammonium citrate in excess, to which is added the copper powder, chromic anhydride $CrO_3$ and a little oxygenated water. It is filtered to remove the last traces of copper not attacked and the filtrate is evaporated on the sand bath.

The compound thus obtained, finely crushed, is subjected to an oxidation in air, for 12 hours at 660° C., which results in an intimate mixture of cupric oxide CuO and cupric chromite $CuCr_2O_4$.

This mixture, finely crushed, is then subjected to the action of a gaseous current constituted of ammonia (10 l./h.) and hydrogen (10 l./h.). The temperature is brought to 1020° C. at the rate of 250° C./h. After fifteen hours maintenance at this temperature in the atmosphere concerned and cooling, radiocrystallographic analysis shows that the product obtained is a dispersion of chromium nitride, CrN in copper.

EXAMPLE 9

In order to prepare a ferronickel alloy with 48% by weight of iron and 52% of nickel, containing 3% by weight of vanadium nitride finely dispersed, one starts by preparing tthe starting product, that is to say a coprecipitate of three hydrated oxides, according to the operational method described in Example 1, by using an aqueous solution of ferric nitrate, of nickel chloride and of vanadyl sulphate as well as a solution of 25% ammonia, the pH being held at 7.5.

The compound thus obtained is subjected to the action of a gaseous current constituted of ammonia (10 l./h.) and hydrogen (10 l./h.). The temperature is brought to 960° C. at the rate of 250° C./h. After fifteen hours maintenance at this temperature in the atmosphere concerned and cooling, there is obtained a mixture of nitrides of iron, nickel and vanadium. A reheating of this mixture finely crushed, for 12 hours at 900° C. in a current of hydrogen of high purity, leads by elimination of nitrogen to a dispersion of vanadium nitride VN in the ferronickel of cubic structure with centred faces neighbouring γ-iron of parameter $a=3.585$ A.

EXAMPLE 10

In order to prepare a dispersion of 10 by weight of titanium nitride TiN in an alloy of nickel with 18% of chromium, one commences by preparing a coprecipitate of the three hydrated oxides according to the operational method described in Example 1 by using a saline solution of ferric nitrate, nickel chloride and chromium sesquichloride in suitable proportions.

The compound thus obtained is subjected to the action of a gaseous current constituted of ammonia (10 l./h.) and hydrogen (10 l./h.). The temperature is brought to 1000° C. at the rate of 250° C./h. After fifteen hours maintenance at this temperature in the atmosphere concerned and cooling, radiocrystallographic analysis shows that the product obtained is constituted by a mixture of nitrides CrN and TiN in metallic nickel.

The chromium nitride CrN being less stable than titanium nitride TiN, the nitrided product previously obtained is reheated at 1000° C. for 15 hours in a current of hydrogen of high purity. This reheating provides the selective and progressive elimination of nitrogen from the chromium nitride. Radiocrystallographic analysis confirms the obtaining of a dispersion of titanium nitride in the alloy Ni-Cr (cubic with centred faces).

EXAMPLE 11

In order to prepare a dispersion of 5% by weight of vanadium nitride VN in the stainless alloy Fe-Ni-Cr of composition: 70% Fe–17% Cr–13% Ni (inox 17–13), one commences by preparing a coprecipitate of the four hydrated oxides according to the operational method described in Example 1 by using a saline solution of ferric nitrate, nickel chloride, chromium sesquichloride and vanadyl sulphate in suitable proportions.

The composition thus obtained is subjected to the action of a gaseous current constituted by ammonia (10 l./h) and hydrogen (10 l./h). The temperature is brought to 1000° C. at the rate of 250° C./h. After fifteen hours maintenance at this temperature in the atmosphere concerned and cooling, radiocrystallographic analysis shows that the product obtained is constituted by the nitrides: $Fe_3$ NiN, γ' $Fe_4N$ and CrN-VN.

The nitrides $Fe_3$ NiN, γ' $Fe_4N$ and CrN being less stable than the nitride VN, the nitrided product previously obtained is finely crushed and reheated at 1000° C. for 12 hours in a current of hydrogen of high purity. This reheating provides the progressive and selective elimination of nitrogen from the nitriles of iron and chromium. Radiocrystallographic analysis confirms the obtaining of a dispersion of vanadium nitride VN in the inox 17–13.

As is self-evident, and as results already from the preceding description, the invention is in no way limited to those of its methods of application, nor to those of its methods of production of its various parts, which have been more particularly indicated; it embraces, on the contrary, all variations.

What is claimed is:

1. Process comprising subjecting at least one first metal to be nitrided and selected from the group consisting of Ti, V, Nb, Ta and Cr, and at least one second metal selected from the group consisting of Fe, Co, Ni, Cu, Zn, Cd, Ag, Sn, Pb, Bi, Ge and Tl, said metals being present in the form of a coprecipitate of hydroxides or a mixed complex, in an atmosphere of hydrogen and ammonia to a temperature sufficient to permit simultaneous reduction and nitriding of said coprecipitate or mixed complex but less than about 1100° C. for a time sufficient to achieve the nitriding of said first metal and to convert said second metal into its metallic form or to the corresponding nitride.

2. Method according to claim 1, wherein the heating is effected at a speed of the order of 100 to 400° C./hour.

3. Method according to claim 1, wherein the step of simultaneous reduction and nitridation is effected in a fixed bed.

4. Method according to claim 1, wherein the step of simultaneous reduction and nitridation is effected in a fluidised bed.

5. Method according to claim 1, wherein the duration of the step of simultaneous reduction and nitridation is of the order of 10 to 20 hours.

6. Method according to claim 1, wherein the proportions of hydrogen and of amomnia of the atmosphere used during the step of simultaneous reduction and nitridation are respectively of the order of 25 to 75% and of 75 to 25%.

7. Method according to claim 1, wherein the second metal being one whose nitride is stable under the conditions of simultaneous nitridation and reduction, there is included a supplementary treatment of reduction with pure hydrogen at the same temperature for a sufficient time to completely reduce the nitride of the second metal.

References Cited

UNITED STATES PATENTS

| | | | |
|---|---|---|---|
| 3,024,110 | 3/1962 | Funkhouser | 75—206 |
| 3,416,891 | 12/1968 | Roubin et al. | 106—55 |
| 3,514,271 | 5/1970 | Yates | 29—182.5 |

OSCAR R. VERTIZ, Primary Examiner

C. B. RODMAN, Assistant Examiner

U.S. Cl. X.R.

23—191; 75—205